(12) United States Patent
Chen

(10) Patent No.: US 7,484,609 B2
(45) Date of Patent: Feb. 3, 2009

(54) HUB ASSEMBLY FOR A BICYCLE

(75) Inventor: Hubert Chen, Taichung Hsien (TW)

(73) Assignee: Kun Teng Industry Co., Ltd., Taichung Hsien (TW)

( * ) Notice: Subject to any disclaimer, the term of this patent is extended or adjusted under 35 U.S.C. 154(b) by 117 days.

(21) Appl. No.: 11/790,698

(22) Filed: Apr. 26, 2007

(65) Prior Publication Data

US 2008/0264748 A1    Oct. 30, 2008

(51) Int. Cl.
*F16D 41/30* (2006.01)
*B60B 27/02* (2006.01)

(52) U.S. Cl. ............... 192/64; 301/110.5; 277/529

(58) Field of Classification Search ............ 192/64
See application file for complete search history.

(56) References Cited

U.S. PATENT DOCUMENTS

| | | | |
|---|---|---|---|
| 6,322,155 B1 * | 11/2001 | Chen | 301/110.5 |
| 6,386,644 B2 * | 5/2002 | Chen | 301/110.5 |
| 6,827,497 B2 * | 12/2004 | Chen | 384/545 |
| 7,121,394 B2 * | 10/2006 | Chen | 192/64 |
| 2005/0139444 A1 * | 6/2005 | Kanehisa et al. | 192/64 |
| 2008/0006500 A1 * | 1/2008 | Spahr | 192/64 |

* cited by examiner

*Primary Examiner*—Richard M. Lorence
(74) *Attorney, Agent, or Firm*—Stephen A. Bent; Foley & Lardner LLP

(57) ABSTRACT

A hub assembly for a bicycle includes a hub shell rotatably mounted on a hub axle, a plurality of pawls disposed respectively in retreat bores in the hub shell to be moved between driven and idle positions, a chainring carrier rotatably mounted on the hub axle, a surrounding drive member coupled with the chainring carrier and having an annular ratchet segment to be coupled with the pawls so as to form a uni-directional mechanism, and an annular barrier member that confronts an annular insertion opening in the hub shell, and a shielding member including a rim which is water-tightly engaged with the insertion opening, and an annular flexible web body which has a tubular tail portion that is kept in frictional contact with a protrusion of the annular barrier member.

7 Claims, 5 Drawing Sheets

HUB ASSEMBLY FOR A BICYCLE

BACKGROUND OF THE INVENTION

1. Field of the Invention

This invention relates to a hub assembly for a bicycle, more particularly to a hub assembly with a ratchet-and-pawl mechanism to drive rotation of a hub shell in a uni-direction.

2. Description of the Related Art

In U.S. Pat. No. 7,121,394 B1, the applicant discloses a bicycle hub assembly that includes a hub shell mounted rotatably on a hub axle, a ratchet-and-pawl mechanism disposed inwardly of the hub shell, a chainring carrier coupled with one end portion of the hub shell through the ratchet-and-pawl mechanism, and an annular shielding unit disposed inwardly of the hub shell to shield the ratchet-and-pawl mechanism. The ratchet-and-pawl mechanism includes a plurality of pawls received in retreat bores formed in the end portion of the hub shell, and a surrounding drive member with a ratchet segment that is inserted into an insertion opening formed in the end portion of the hub shell so as to be coupled with the pawls such that the drive of the chainring carrier is transmitted uni-directionally to the hub shell.

The annular shielding unit has a rim which is sleeved on the chainring carrier, and a surrounding portion which extends radially from the rim towards the insertion opening so as to be kept in frictional contact with an inner peripheral surface of the end portion of the hub shell. However, dust and moisture may enter the clearance between the surrounding portion and the chainring carrier.

SUMMARY OF THE INVENTION

The object of the present invention is to provide a hub assembly which has a labyrinthine type shielding member that provides an enhanced dust and moisture proofing effect.

According to this invention, the hub assembly for a bicycle includes a hub shell which includes a shell body and a tubular mount. The shell body is adapted to be mounted on and rotatable relative to a hub axle of the bicycle about an axis, and extends rightwardly to terminate at a right annular juncture. The tubular mount extends axially from the right annular juncture to terminate at a surrounding exterior surface that faces rightwards, and further extends radially and outwardly to terminate at an outer mount wall surface. The tubular mount has an inner tubular wall surface which is adapted to be spaced apart from the hub axle so as to define an annular accommodation space therebetween. The inner tubular wall surface has a plurality of retreat bores which are angularly displaced from one another about the axis. The surrounding exterior surface defines an annular insertion opening which extends axially to form an inner peripheral wall surface, and which is communicated with the retreat bores. A plurality of pawls are disposed in the retreat bores, respectively, such that each of the pawls is movable between a driven position, where the pawls extend radially into the annular accommodation space, and an idle position, where the pawls retreat radially into the retreat bores. A chainring carrier is adapted to be rotatably mounted on the hub axle. A surrounding drive member is coupled with the chainring carrier, and includes an annular ratchet segment which extends into the annular accommodation space to be coupled with the pawls in one of the driven and idle positions so as to form a uni-directional mechanism that enables transmission of drive of the chainring carrier to rotate the hub shell, and an annular barrier member which has inner and outer annular major surfaces, and an annular protrusion that extends from the inner annular major surface toward the retreat bores. A shielding member includes a rim which is configured to be fitted to and which is in water-tight engagement with the inner peripheral wall surface, and an annular flexible web body which extends radially from the rim to terminate at a tubular tail portion. The tubular tail portion surrounds the protrusion, and is configured to trail on and to be kept in frictional contact with the protrusion.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
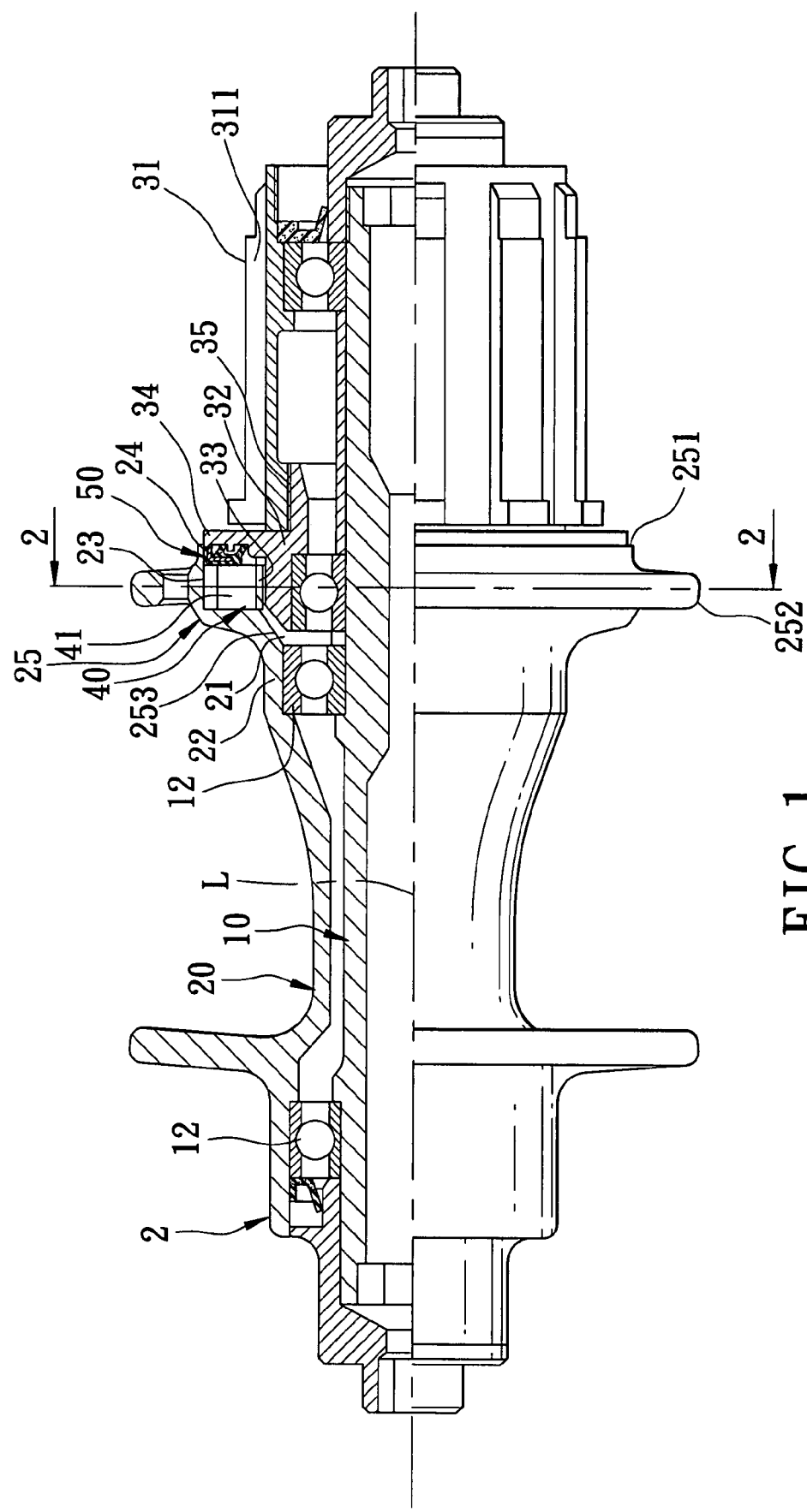
FIG. 1 is a partly sectional view of the first preferred embodiment of a hub assembly for a bicycle according to this invention.
Figure 2:
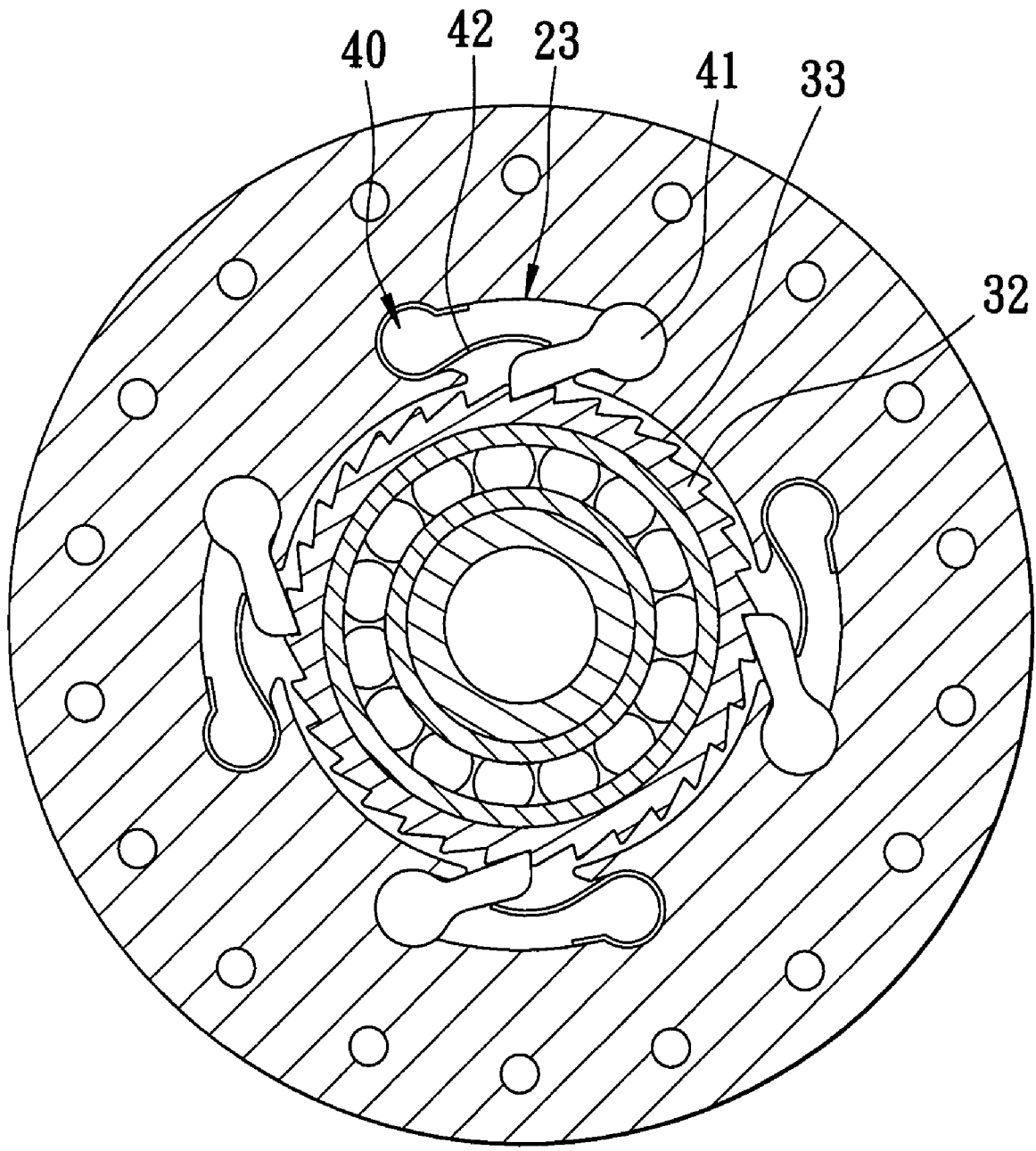
FIG. 2 is a cross-sectional view of the first preferred embodiment, taken along line 2-2 of FIG. 1.

Referring to FIGS. 1 and 2, the preferred embodiment of a hub assembly for a bicycle according to the present invention is shown to comprise a hub shell 2, a chainring carrier 31, a ratchet-and-pawl mechanism 40, and a shielding member 50.

Figure 4:
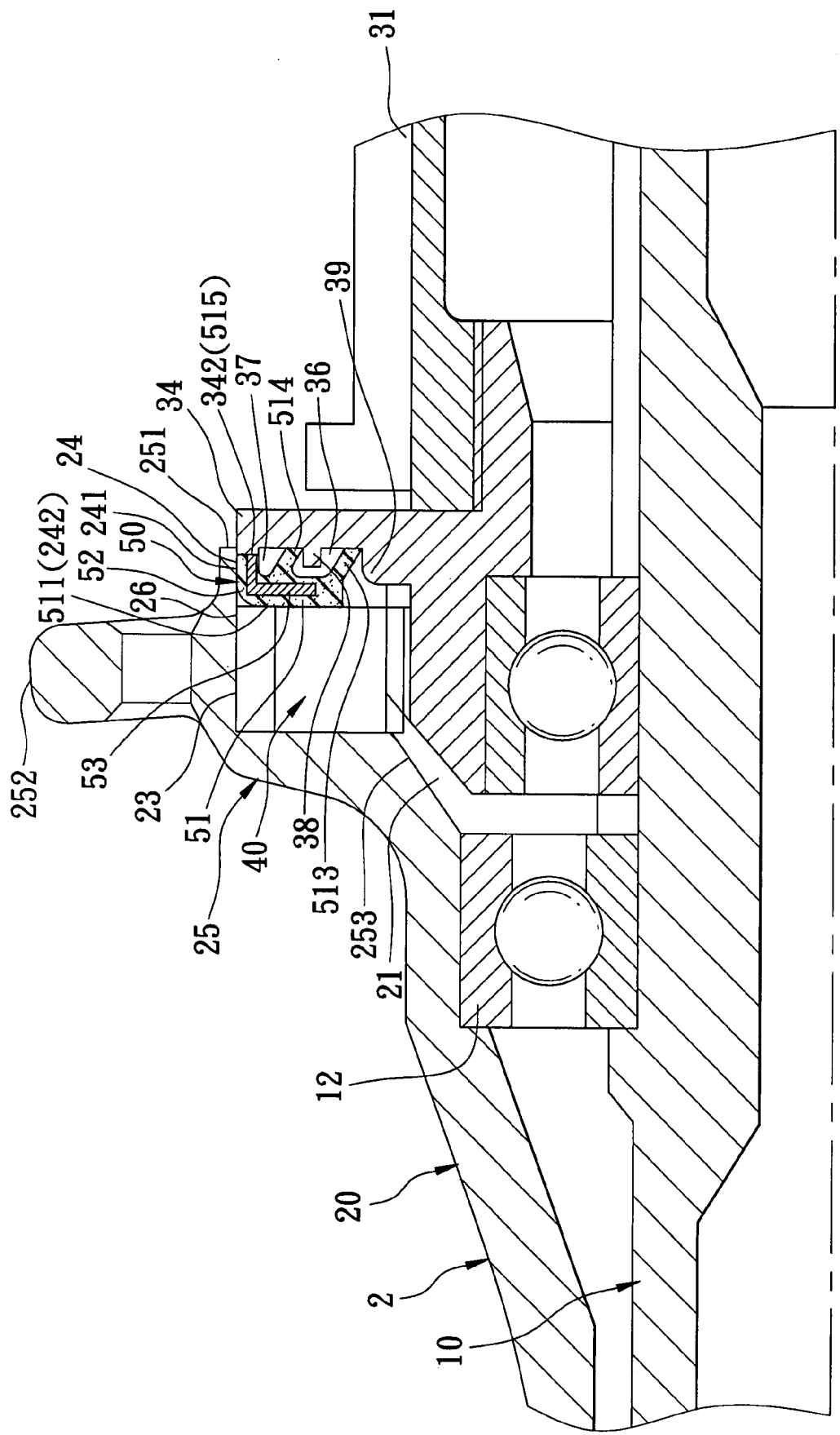
FIG. 4 is a fragmentary partly sectional view of the shielding member of the first preferred embodiment.

The hub shell 2 has a shell body 20 which is adapted to be mounted on and rotatable relative to the hub axle 10 about an axis (L) by means of anti-friction bearings 12, and which extends rightwardly to terminate at a right annular juncture 22, and a tubular mount 25 which extends from the right annular juncture 22 along the axis (L) to terminate at a surrounding exterior surface 251 that faces rightwards, and which extends in radial directions and outwardly to terminate at an outer mount wall surface 252 that is interposed between the surrounding exterior surface 251 and the right annular juncture 22. The tubular mount 25 has an inner tubular wall surface 253 which is opposite to the outer mount wall surface 252 in radial directions, and which is adapted to be spaced apart from the hub axle 10 so as to define an annular accommodation space 21 therebetween. The inner tubular wall surface 253 has a plurality of retreat bores 23 which are angularly displaced from one another about the axis (L), and which extend respectively and radially toward the outer mount wall surface 252. The surrounding exterior surface 251 defines an annular insertion opening 24 which extends along the axis (L) toward the right annular juncture 22 to form an inner peripheral wall surface 241, and which terminates at a surrounding abutment wall surface 242 (as shown in FIG. 4) that has a plurality of access holes 26 angularly displaced from one another about the axis (L) and communicated with the retreat bores 23, respectively.

The chainring carrier 31 is adapted to be rotatably mounted on the hub axle 10, and is disposed rightwardly of the hub shell 2. The chainring carrier 31 has a non-circular slot 311 for mounting a chainring assembly (not shown).

The ratchet-and-pawl mechanism 40 includes a plurality of pawls 41, a surrounding drive member 32, and a plurality of biasing members 42.

The pawls 41 are respectively disposed in the retreat bores 23 through the access holes 26 such that each of the pawls 41 is movable between a driven position, where the pawls 41 extend radially into the annular accommodation space 21, and an idle position, where the pawls 41 retreat radially into the retreat bores 23.

Figure 3:
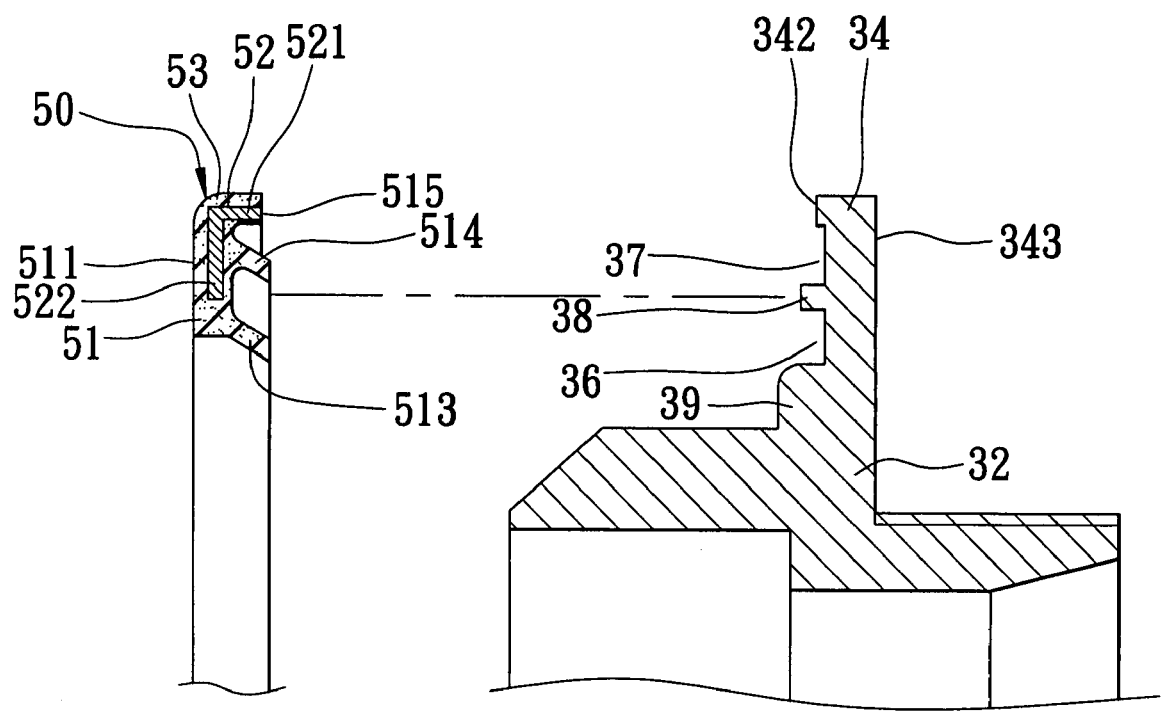
FIG. 3 is a fragmentary exploded and partly sectional view of a shielding member of the first preferred embodiment.

The surrounding drive member 32 includes a coupling segment 35 which is engaged threadedly with the chainring carrier 31, and an annular ratchet segment 33 which extends leftwardly from the coupling segment 35 into the annular accommodation space 21 to confront the pawls 41 radially and which is coupled with the pawls 41 in one of the driven and idle position so as to form a uni-directional mechanism that enables transmission of the drive of the chainring carrier 31 to rotate the hub shell 2. Referring to FIGS. 3 and 4, the surrounding drive member 32 further includes an annular barrier member 34 which has inner and outer annular major surfaces 342,343 that are opposite to each other along the axis (L) and that respectively confront the retreat bores 23 and the chainring carrier 31, and two annular protrusions 38,39 that extend from the inner annular major surface 342 toward the retreat bores 23 so as to cooperate with the inner annular major surface 342 to define two annular grooves 37,36.

The shielding member 50 includes a rim 53 which is configured to be fitted to and which is in water-tight engagement with the inner peripheral wall surface 241, and an annular flexible web body 51 which extends from the rim 53 in radial directions towards the annular ratchet segment 33, and towards the inner annular major surface 342 to terminate at two tubular tail portions 514,513. The tubular tail portions 514,513 are configured to extend respectively into the annular grooves 37,36 to surround the protrusions 38,39, respectively, so as to trail on and to keep in frictional contact with the respective protrusions 38,39. Preferably, the tubular tail portions 514,513 are configured to be kept in frictional contact with the inner annular major surface 342. The rim 53 and the annular flexible web body 51 are formed from a deformable material, such as rubber, as an integral one-piece structure. The rim 53 has an outer annular abutment surface 515 which confronts and which is configured to be kept in frictional contact with the inner annular major surface 342. The flexible web body 51 has an inner annular abutment surface 511 which is configured to abut against the surrounding abutment wall surface 242 so as to cover the access holes 26.

The shielding member 50 further includes a reinforcement body 52 which is made from a metal material, and which is embedded in both the flexible web body 51 and the rim 53 for reinforcement purposes. Particularly, the reinforcement body 52 has an L-shaped cross-section, and includes an axially-extending surrounding segment 521, and a radially-extending base segment 522.

Referring again to FIGS. 1 and 4, after assembly, the shielding member 50 is fitted into the annular insertion opening 24 such that the ratchet-and-pawl mechanism 40 is retained axially by the inner annular abutment surface 511. Meanwhile, the inner annular major surface 342 of the barrier member 34 is kept in frictional contact with the outer annular abutment surface 515 of the rim 53, and the tubular tail portions 513,514 are engaged in the annular grooves 36,37 to be in frictional engagement with the inner annular major surface 342 and the protrusions 39,38. Thus, by virtue of the engagement between the tubular tail portions 513, 514 and the annular grooves 36,37, the shielding member 50 provides a labyrinthine-type barrier effect. That is, dust and moisture that are trapped in the clearance between the tubular tail portion 514 and the inner annular major surface 342 can be prevented from entering the annular groove 36 by means of the protrusion 38.

Moreover, since the annular grooves 36,37 are configured to open toward the shielding member 50 and are disposed inwardly of the hub shell 2, and since the inner annular major surface 342 is disposed to frictionally engage the outer annular abutment surface 515, the shielding member 50 can provide a better sealing effect.

Figure 5:
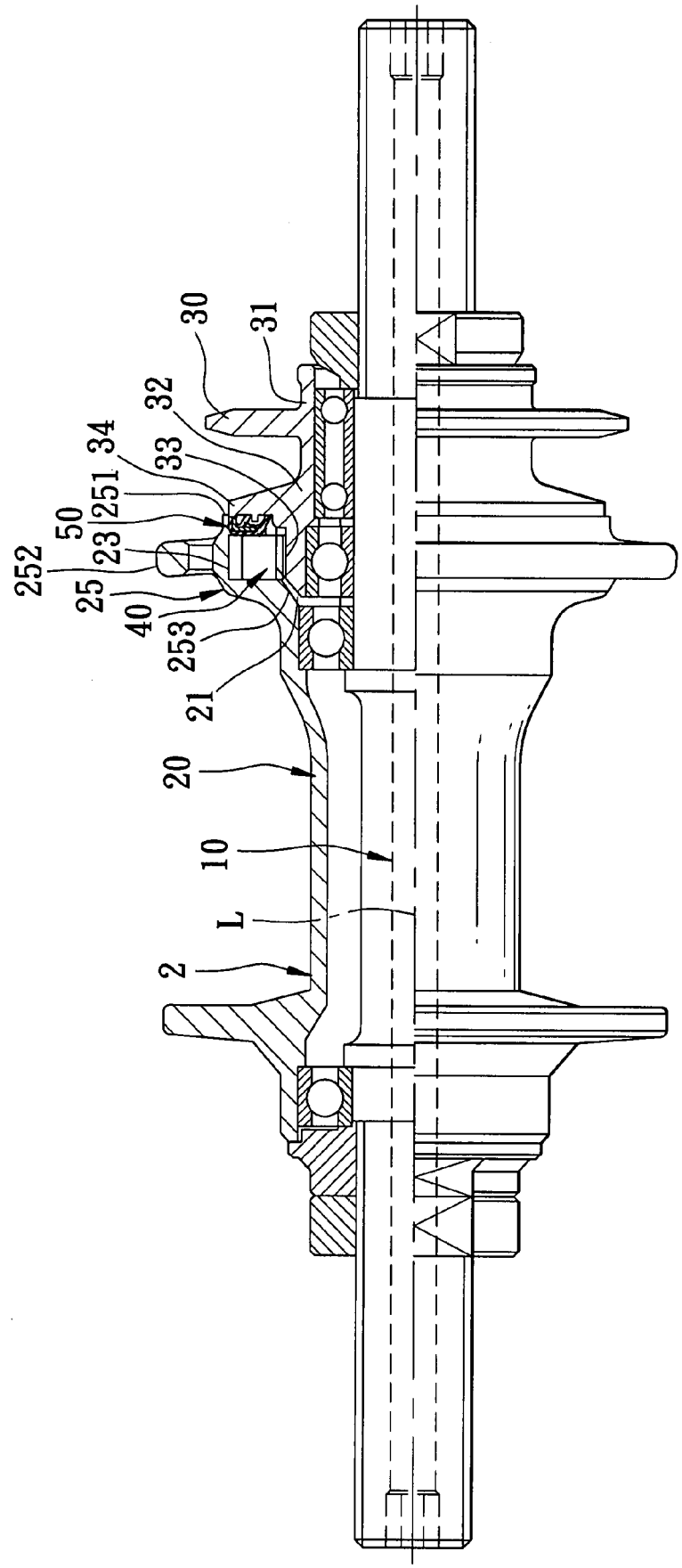
FIG. 5 is a partly sectional view of the second preferred embodiment of a hub assembly for a bicycle according to this invention.

Referring to FIG. 5, the second preferred embodiment of a hub assembly for a bicycle according to this invention is shown to be similar to the first embodiment in construction, except that the chainring carrier 31 is used with a single chainring 30 such that the chainring carrier 31 is integrally formed with the surrounding drive member 32 and the chainring 30.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A hub assembly for a bicycle which has a hub axle, comprising:
    a hub shell including
        a shell body which is adapted to be mounted on and rotatable relative to the hub axle about an axis, and which extends rightwardly to terminate at a right annular juncture, and
        a tubular mount which extends from said right annular juncture along the axis to terminate at a surrounding exterior surface that faces rightwards, and which extends in radial directions and outwardly to terminate at an outer mount wall surface that is interposed between said surrounding exterior surface and said right annular juncture, said tubular mount having an inner tubular wall surface which is opposite to said outer mount wall surface in radial directions, and which is adapted to be spaced apart from the hub axle so as to define an annular accommodation space therebetween, said inner tubular wall surface having a plurality of retreat bores which are angularly displaced from one another about the axis, and which extend radially and respectively toward said outer mount wall surface, said surrounding exterior surface defining an annular insertion opening which extends along the axis toward said right annular juncture to form an inner peripheral wall surface, and which is communicated with said retreat bores;
    a plurality of pawls which are disposed in said retreat bores, respectively, such that each of said pawls is movable between a driven position, where said pawls extend radially into said annular accommodation space, and an idle position, where said pawls retreat radially into said retreat bores;
    a chainring carrier which is adapted to be rotatably mounted on the hub axle;
    a surrounding drive member which is coupled with said chainring carrier, and which includes
        an annular ratchet segment which is disposed leftwardly of said chainring carrier, and which extends into said annular accommodation space to confront said pawls radially, said annular ratchet segment being coupled with said pawls in one of the driven and idle positions so as to form a uni-directional mechanism that enables transmission of drive of said chainring carrier to rotate said hub shell, and an annular barrier member having inner and outer annular major surfaces which are opposite to each other along the axis, and which respectively confront said retreat bores and said chainring carrier, and an annular protrusion which extends from said inner annular major surface toward said retreat bores; and a shielding member including a rim which is configured to be fitted to and which is in water-tight engagement with said inner peripheral wall surface, and an annular flexible web body which extends from said rim in radial directions towards said annular ratchet segment, and towards said inner annular major surface to terminate at a tubular tail portion, said tubular tail portion surrounding said protrusion, and being configured to trail on and to be kept in frictional contact with said protrusion.

2. The hub assembly of claim 1, wherein said annular insertion opening extends to terminate at a surrounding abutment wall surface which has a plurality of access holes that are angularly displaced from one another about the axis and that are communicated with said retreat bores, respectively, such that said pawls are respectively disposed in said retreat bores through said access holes, said flexible web body having an inner annular abutment surface which is configured to abut against said surrounding abutment wall surface so as to cover said access holes.

3. The hub assembly of claim 1, wherein said rim is made from a deformable material, and has an outer annular abutment surface which confronts and which is configured to be kept in frictional contact with said inner annular major surface.

4. The hub assembly of claim 1, wherein said flexible web body is made from a deformable material, and is integrally formed with said rim, said shielding member further including a reinforcement body which is made from a metal material, and which is embedded in said flexible web body and said rim for reinforcement purposes.

5. The hub assembly of claim 1, wherein said chainring carrier is engaged threadedly with said surrounding drive member.

6. The hub assembly of claim 1, wherein said chainring carrier is integrally formed with said surrounding drive member.

7. The hub assembly of claim 1, wherein said tubular tail portion is configured to trail on and to be kept in frictional contact with said inner annular major surface.

* * * * *